US012047833B2

(12) United States Patent
Nagashima et al.

(10) Patent No.: US 12,047,833 B2
(45) Date of Patent: Jul. 23, 2024

(54) METHOD AND SYSTEM FOR CONNECTION HANDOVER FROM TELEPRESENCE ROBOT TO MOBILE OFFICE

(71) Applicant: Toyota Motor Engineering & Manufacturing North America, Inc., Plano, TX (US)

(72) Inventors: Satoshi Nagashima, Long Island City, NY (US); John F. Daly, Frisco, TX (US); Adrian Lombard, Saline, MI (US); Paul Li, Mountain View, CA (US); Kruti Vekaria, Arlington, VA (US); Yasushi Onda, Musashino (JP); Kaya Onda, Musashino (JP)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 224 days.

(21) Appl. No.: 17/681,249

(22) Filed: Feb. 25, 2022

(65) Prior Publication Data
US 2023/0276334 A1    Aug. 31, 2023

(51) Int. Cl.
*H04W 36/32*      (2009.01)
*G05B 19/4155*   (2006.01)
*G06K 7/10*         (2006.01)
*G06K 7/14*         (2006.01)
*H04L 65/403*     (2022.01)

(52) U.S. Cl.
CPC ........ *H04W 36/32* (2013.01); *G05B 19/4155* (2013.01); *G06K 7/10722* (2013.01); *G06K 7/1417* (2013.01); *H04L 65/403* (2013.01); *G05B 2219/50391* (2013.01)

(58) Field of Classification Search
None
See application file for complete search history.

(56) References Cited

U.S. PATENT DOCUMENTS

| 9,533,411 | B2 | 1/2017 | Jacobsen et al. | |
|---|---|---|---|---|
| 9,955,318 | B1 | 4/2018 | Scheper et al. | |
| 10,320,900 | B2 | 6/2019 | Nishikawa | |
| 10,726,633 | B2 | 7/2020 | Deng et al. | |
| 2013/0035790 | A1* | 2/2013 | Olivier, III | G06V 40/161 |
| | | | | 901/1 |
| 2017/0358201 | A1* | 12/2017 | Govers | G08B 31/00 |
| 2019/0146518 | A1* | 5/2019 | Deng | G06T 7/73 |
| | | | | 382/118 |
| 2020/0019167 | A1* | 1/2020 | Alshamrani | G05D 1/101 |
| 2021/0402600 | A1* | 12/2021 | Kim | B25J 9/1666 |
| 2022/0288778 | A1* | 9/2022 | Østergaard | G05D 1/0246 |
| 2022/0345971 | A1* | 10/2022 | Fang | H04L 67/1029 |

FOREIGN PATENT DOCUMENTS

WO     2008106088 A2    9/2008

* cited by examiner

*Primary Examiner* — Duc Nguyen
*Assistant Examiner* — Assad Mohammed
(74) *Attorney, Agent, or Firm* — DINSMORE & SHOHL LLP (57) ABSTRACT

A telepresence robot is provided including a controller. The controller is programmed to, after establishing a remote connection with a remote user, monitor movement of a tracked individual, detect when the tracked individual has entered an office space, and upon determination that the tracked individual has entered the office space, identify the office space and transfer a connection with the remote user from the telepresence robot to a device in the office space.

18 Claims, 5 Drawing Sheets

METHOD AND SYSTEM FOR CONNECTION HANDOVER FROM TELEPRESENCE ROBOT TO MOBILE OFFICE

TECHNICAL FIELD

The present specification relates to remote communication and more particularly to a method and system for connection handover from telepresence robot to mobile office.

BACKGROUND

Video conferencing may allow employees, colleagues, friends, family, and other people who are located at physically distant locations from each other to communicate virtually through audio and video presentation. Thus, video conferencing may allow for face-to-face interactions without the need for people to be physically present in the same location. However, video conferencing typically requires participants to remain in a fixed location during a video conference.

Telepresence robots allow for users to have a physical presence in a remote location. In particular, a telepresence robot may move around the remote location and allow the remote user to interact with people physically located in the remote location via the telepresence robot. Both video conferencing and telepresence robots have advantages and disadvantages for remote communication. Accordingly, a need exists for a system that integrates video conferencing and telepresence robots.

SUMMARY

In an embodiment, a telepresence robot may include a controller. The controller may be programmed to; after establishing a remote connection with a remote user, monitor movement of a tracked individual, detect when the tracked individual has entered an office space, and upon determination that the tracked individual has entered the office space, identify the office space and transfer a connection with the remote user from the telepresence robot to a device in the office space.

In another embodiment, a method may include, after establishing a remote connection between a telepresence robot and a remote user, monitoring movement of a tracked individual, detecting when the tracked individual has entered an office space, and upon determination that the tracked individual has entered the office space, identifying the office space and transferring a connection with the remote user from the telepresence robot to a device in the office space.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for connection handover from telepresence robot to mobile office. A remote user (a user located remotely from a telepresence robot) may connect to a telepresence robot located in a remote location (a location remote from the remote user) and the telepresence robot may move around the remote location and allow the remote user to interact with people in the remote location. In particular, the telepresence robot may display real-time video of the remote user and output real-time audio of the remote user to the people in the remote location. In addition, the telepresence robot may capture audio and video of the remote location and transmit the captured audio and video to the remote user (e.g., to be displayed on the remote user's personal computer or smartphone). This may allow the people in the remote location to interact and communicate with the remote user, via the telepresence robot, as if the remote user were physically located in the remote location. In particular, the remote user may have face-to-face conversations with one or more people located in the remote location via the telepresence robot.

However, if a person in the remote location who the remote user is having a conversation with walks into an office space, it may be difficult for the telepresence robot to follow the person into the office space, given space limitations. However, many office spaces have video conferencing capabilities. As such, in embodiments disclosed herein, when a person in the remote location is having a conversation with the remote user via the telepresence robot and walks into an office space, the connection between the remote user and the telepresence robot is automatically transferred to the video conferencing equipment of the conference room or remote office, using the techniques described herein. Thus, the remote user may seamlessly continue the conversation with the person in the remote location person who has entered the office space.

Figure 1:
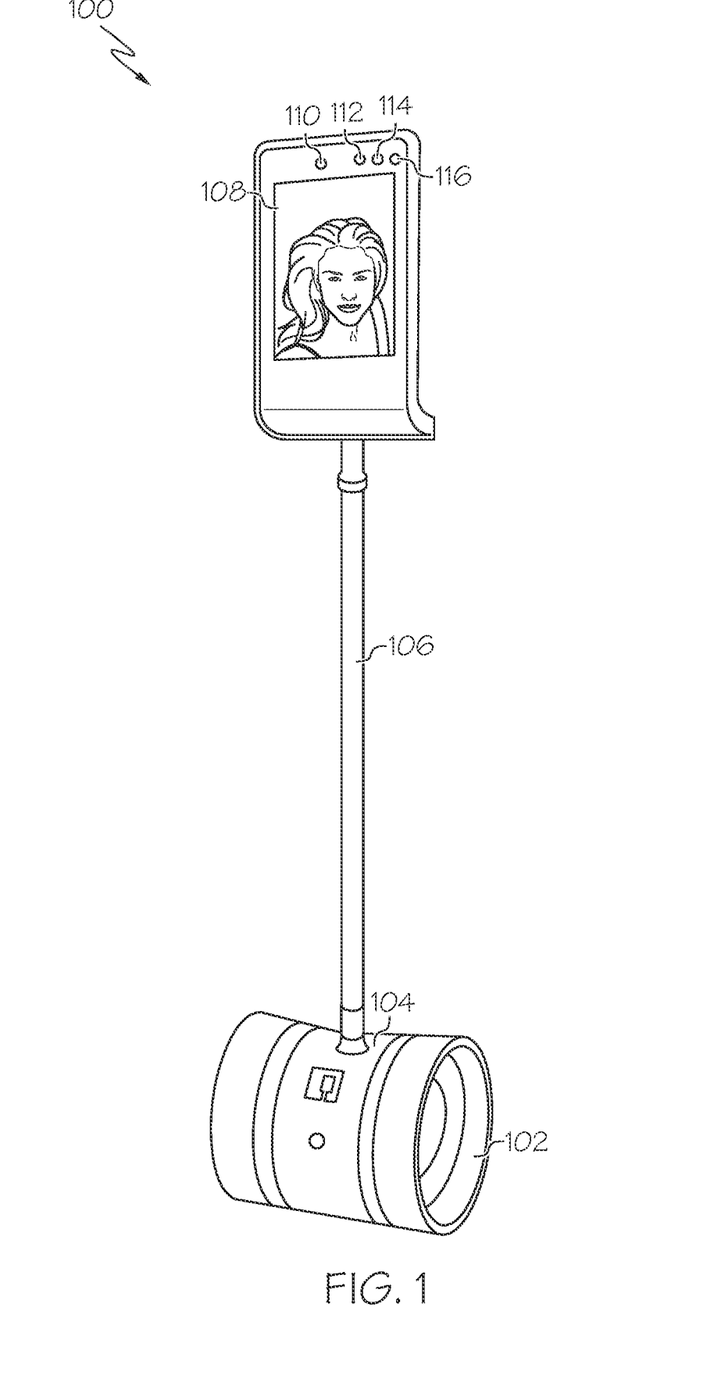
FIG. 1 depicts an example telepresence robot, according to one or more embodiments shown and described herein.

Turning now to the figures, FIG. 1 depicts an exemplary telepresence robot 100. In the example of FIG. 1, the telepresence robot 100 may include wheels 102 or other modes of transport that allow the telepresence robot 100 to move around an environment. In some examples, the wheels 102 may be omni wheels or another type of wheel that allows the telepresence robot 100 to move in multiple directions. The movement of the telepresence robot 100 may be controlled by a remote user or may be controlled autonomously, as disclosed in further detail below.

The telepresence robot 100 may further include a base 104 coupled to the wheels 102. The base 104 may provide stability for the telepresence robot 100. The base 104 may also house various electronics used by the telepresence robot 100, such as a control system disclosed in further detail below.

The telepresence robot 100 may also include a stand 106 extending from the base 104. The stand 106 may provide the telepresence robot 100 with height. The length of the stand 106 may approximate human height.

A display screen 108 may be connected to the stand 106. The display screen 108 may display an image or real-time video of a remote user, as discussed in further detail below. As such, when the telepresence robot 100 is located in a remote location, people in the remote location who approach the telepresence robot 100 may see the image or real-time video of the remote user displayed on the display screen 108, thereby giving the sense that the remote user is physically present in the remote location.

In embodiments, the remote user may connect to the telepresence robot 100 via various hardware (e.g., a personal computer or a smartphone), as discussed in further detail below. In some examples, the hardware that the remote user uses to connect to the telepresence robot 100 may capture a real-time image or video of the remote user, which may be displayed on the display screen 108. Thus, people in the remote location around the telepresence robot 100 may view the remote user's facial expression and other reactions in real-time. In other examples, the display screen 108 may display a static image of the remote user (e.g., a still image of the remote user or an avatar selected by the remote user).

A camera 110 may capture video of a scene in front of the telepresence robot 100 and a microphone 112 may capture audio of the scene around the telepresence robot 100. As audio and video are captured by the camera 110 and the microphone 112, the captured audio and video may be transmitted to the remote user's hardware. When the hardware of the remote user receives the audio and video captured by the camera 110 and the microphone 112, the captured audio may be output via speakers and the captured video may be displayed on a screen to the remote user. Thus, the remote user may be able to see and hear whatever is going on in the remote location in the presence of the telepresence robot 100.

A speaker 114 may output audio spoken by the remote user. In particular, the remote user's hardware may capture audio of the remote user and transmit the hardware to the telepresence robot 100. The telepresence robot 100 may receive the audio and the received audio may be output by the speaker 114. Thus, the remote user may speak to people in the remote location via the telepresence robot 100. The telepresence robot 100 may also include one or more additional sensors 116, as discussed in further detail below.

As described above, the telepresence robot 100 allows a remote user to have a physical presence in the remote location. The telepresence robot 100 may capture audio and video from the remote location and transmit the captured audio and video back to the remote user. The telepresence robot 100 may also receive audio and video of the remote user and output the audio and display the video from the remote user. Thus, the remote user may utilize the telepresence robot 100 to interact and communicate with people at the remote location, and people at the remote location may interact and communicate with the remote user via the telepresence robot 100. In particular, the remote user and people located in the remote location may converse with each other.

In embodiments, the telepresence robot 100 may move around the remote location. In particular, the telepresence robot 100 may have control hardware such that the telepresence robot 100 balances upright, with the stand 106 extending vertically from the base 104 and the display screen 108 positioned perpendicular to the ground such that people in the remote location can easily see the image on the display screen 108. In addition, the telepresence robot 100 may have control hardware to move around the remote location using the wheels 102. In some examples, the remote user may control the movement of the telepresence robot 100 (e.g., by using a joystick or computer keyboard). In other examples, the telepresence robot 100 may move autonomously.

Figure 2:
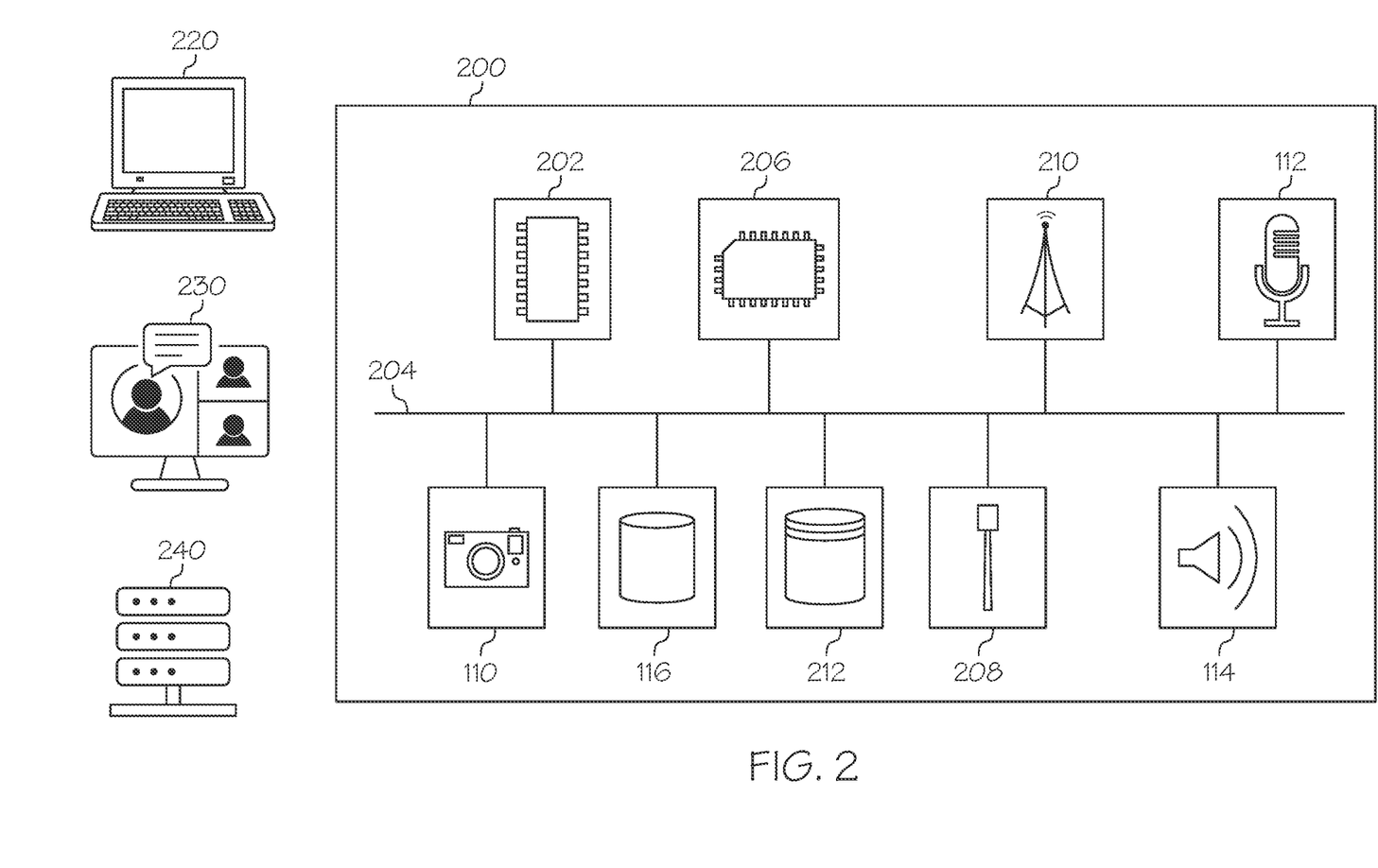
FIG. 2 depicts a schematic diagram of a control system of the telepresence robot of FIG. 1, according to one or more embodiments shown and described herein.

FIG. 2 depicts an exemplary control system 200 that may be included in the telepresence robot 100 of FIG. 1. In embodiments, one or more elements of the control system 200 may be housed in the base 104 of the telepresence robot 100. In the example of FIG. 2, the control system 200 includes one or more processors 202, a communication path 204, one or more memory modules 206, a satellite antenna 208, the camera 110 of FIG. 1, the microphone 112 of FIG. 1, the speaker 114 of FIG. 1, the one or more sensors 116 of FIG. 1, a network interface hardware 210, and a data storage component 212, the details of which will be set forth in the following paragraphs. Also depicted in FIG. 2 is a hardware device 220, a video conference device 230, and a server 240. The hardware device 220 may be a personal computer, smartphone, or other device used by the remote user to communicate with the telepresence robot 100, as disclosed in further detail below. The video conference device 230 may be located at the remote location and may be used to establish a video conference, as disclosed in further detail below. The server 240 may communicate with the telepresence robot 100, the hardware device 220, and/or the video conference device 230, as disclosed in further detail below.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the control system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NEC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The control system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206 are discussed in further detail below with respect to FIG. 3.

Referring still to FIG. 2, the control system 200 comprises a satellite antenna 208 coupled to the communication path 204 such that the communication path 204 communicatively couples the satellite antenna 208 to other modules of the control system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the location of the telepresence robot 100. The satellite antenna 208 may be utilized to localize the telepresence robot 100.

The control system 200 includes the camera 110, the microphone 112, the speaker 114, and the one or more sensors 116 of FIG. 1. As discussed above with respect to FIG. 1, the camera 110 may capture video and the microphone 112 may capture audio from the location where the telepresence robot 100 is located. The speaker 114 may output audio (e.g., speech of the remote user).

Referring still to FIG. 2, each of the one or more sensors 116 is coupled to the communication path 204 and communicatively coupled to the one or more processors 202. The one or more sensors 116 may include, but are not limited to, LiDAR sensors, RADAR, sensors, optical sensors (e.g., cameras, laser sensors), proximity sensors, location sensors (e.g., GPS modules), and the like. In embodiments, the sensors 116 may monitor the surroundings of the telepresence robot 100 and may detect people or other objects in the surrounding environment. The data captured by the telepresence robot 100 may be used to autonomously navigate the telepresence robot 100 and/or to track the motion of one or more individuals and determine when they have entered an office space, as discussed in further detail below.

Still referring to FIG. 2, the control system 200 comprises network interface hardware 210 for communicatively coupling the control system 200 to one or more external devices, such as the hardware device 220, the video conference device 230, and/or the server 240 of FIG. 2.

The network interface hardware 210 can be communicatively coupled to the communication path 204 and can be any device capable of transmitting and/or receiving data via a network. Accordingly, the network interface hardware 210 can include a communication transceiver for sending and/or receiving any wired or wireless communication. For example, the network interface hardware 210 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 210 includes hardware configured to operate in accordance with the Bluetooth® wireless communication protocol.

Still referring to FIG. 2, the control system 200 comprises a data storage component 212. The data storage component 212 may store data used by various components of the control system 200. In addition, the data storage component 212 may store data collected by the camera 110, the microphone 112, and/or the sensors 116.

In some embodiments, the control system 200 may be communicatively coupled to the hardware device 220 and/or the video conference device 230 at the remote location by a network. In one embodiment, the network may include one or more computer networks (e.g., a personal area network, a local area network, or a wide area network), cellular networks, satellite networks and/or a global positioning system and combinations thereof. Accordingly, the control system 200 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTL, WiMAX, UMTS, CDMA, and GSM.

Figure 3:
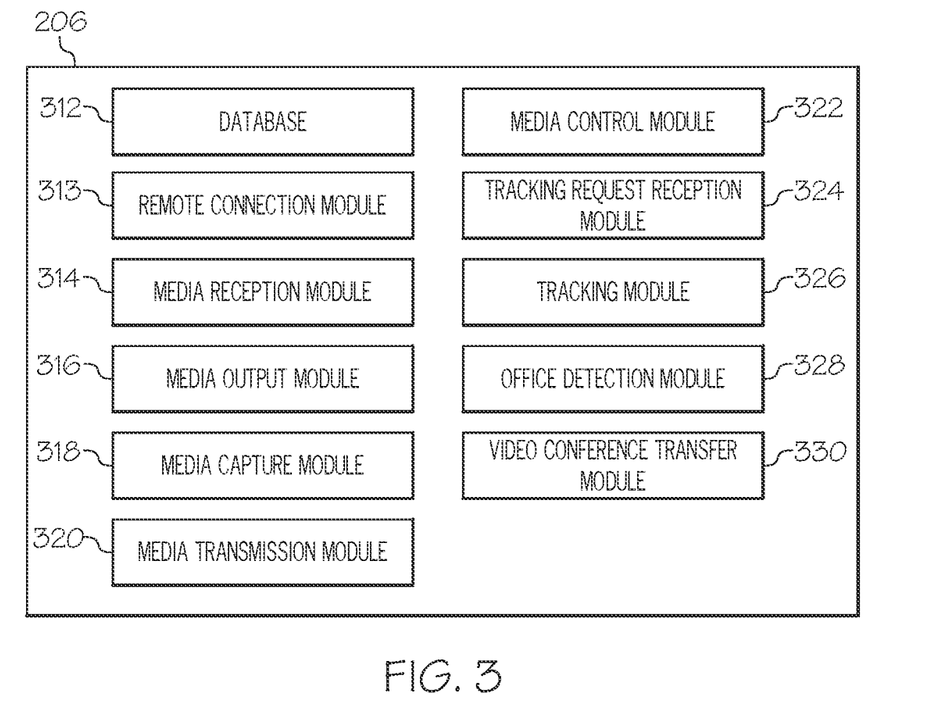
FIG. 3 depicts example memory modules of the control system of FIG. 2, according to one or more embodiments shown and described herein.

Now referring to FIG. 3, the memory modules 206 of the control system 200 includes a database 312, a remote connection module 313, a media reception module 314, a media output module 316, a media capture module 318, a media transmission module 320, a motion control module 322, a tracking request reception module 324, a tracking module 326, an office detection module 328, and a video conference transfer module 330. Each of the database 312, the remote connection module 313, the media reception module 314, the media output module 316, the media capture module 318, the media transmission module 320, the motion control module 322, the tracking request reception module 324, the tracking module 326, the office detection module 328, and the video conference transfer module 330 may be a program module in the form of operating systems, application program modules, and other program modules stored in the one or more memory modules 206. In some embodiments, the program module may be stored in a remote storage device that may communicate with the control system 200. Such a program module may include, but is not limited to, routines, subroutines, programs, objects, components, data structures and the like for performing specific tasks or executing specific data types as will be described below.

The database 312 may store ID's associated with a plurality of office spaces located in one or more locations. This may allow a video call to be transferred from the telepresence robot 100 to one of the offices, as discussed in further detail below. In some examples, the database 312 may store maps of offices spaces within one or more locations.

The remote connection module 313 may establish a remote connection with the remote user. In particular, the remote connection module 313 may establish a connection between the telepresence robot 100 and the hardware device 220.

The media reception module 314 may receive media data from the remote user. As discussed above, the telepresence robot 100 may display a real-time image or video of the remote user on the display screen 108 and output real-time audio from the remote user via the speaker 114. This may be accomplished by the remote user using certain hardware and/or software (e.g., the hardware device 220 of FIG. 2) to capture audio and video of him or herself to be transmitted to the telepresence robot 100. For example, the remote user may install software on a personal computer or smartphone that is compatible with the telepresence robot 100. The software may allow the remote user to speak into a microphone (e.g., a built-in microphone of the personal computer or smartphone) while looking into a camera (e.g., a built-in camera of the personal computer or smartphone) and transmit real-time audio and video of the remote user to the telepresence robot 100. The real-time audio and video from the remote user may be received by the media reception module 314.

The media output module 316 may output the media received by the media reception module 314. In particular, the media output module 316 may cause the display screen 108 to display received video of the remote user and may cause the speaker 114 to output received audio from the remote user. As such, people in the remote location may see and hear the remote user via the telepresence robot 100.

The media capture module 318 may capture media from the remote location. In particular, the media capture module 318 may receive video captured by the camera 110 and audio captured by the microphone 112. This may allow the telepresence robot 100 to capture audio and video that can be seen and heard from the perspective of the telepresence robot 100. In other words, the media capture module 318 may capture audio and video that would be seen and heard by a person located where the telepresence robot 100 is located.

The media transmission module 320 may transmit the media captured by the media capture module 318 to the remote user. In particular, the media transmission module 320 may transmit the video captured by the camera 110 and the audio captured by the microphone 112 to the hardware device 220 of the remote user. The hardware device 220 may then display the video and playback the audio transmitted by the media transmission module 320. For example, a screen of the hardware device 220 of the remote user may display real-time video captured by the camera 110 and a speaker of the personal computer or smartphone of the remote user may output real-time audio captured by the microphone 112. As such, the remote user may see and hear audio and video from the perspective of the telepresence robot 100 in the remote location.

The motion control module 322 may control the motion of the telepresence robot 100. In particular, the motion control module 322 may control the movement of the wheels 102 to ensure that the telepresence robot 100 remains upright and to move the telepresence robot 100 based on movement control instructions. In some examples, the motion control module 322 may receive movement control instructions from the remote user. For example, the remote user may utilize a joystick or other control mechanism to move the telepresence robot 100 around the remote location as they see fit. In other examples, the motion control module 322 may generate autonomous movement control instructions to control movement of the telepresence robot 100. For example, the motion control module 322 may control the movement of the telepresence robot 100 to follow a particular person in the remote location, as discussed in further detail below.

The tracking request reception module 324 may receive a request from the remote user to track a particular individual in the remote location. For example, the tracking request reception module 324 may receive a request from the remote user to track an individual that the remote user is having a conversation with via the telepresence robot 100. Thus, by tracking a particular individual in the remote location, the telepresence robot 100 may transfer a connection with the remote user from the telepresence robot 100 to a video conference (e.g., via the video conference device 230), as discussed in further detail below.

The remote user may select an individual to be tracked using a variety of techniques. In one example, while the remote user views real-time video captured by the telepresence robot 100, the remote user may select an individual to be tracked using a touchscreen, a mouse, or other peripherals. In other examples, the remote user may select a pre-registered individual to be tracked. For example, the database 312 may store a list of individuals that can be selected to be tracked, along with facial features or other identifying information that the telepresence robot 100 may use to track the individual. Once the remote user selects an individual to be tracked, the selection may be transmitted from the hardware device 220 to the telepresence robot 100 and received by the tracking request reception module 324.

The tracking module 326 may track the individual selected to be tracked as received by the tracking request reception module 324. The tracking module 326 may utilize a variety of techniques to track the selected individual, as disclosed herein. In particular, the tracking module 326 may receive data captured by the camera 110 and/or the sensors 116 and utilize this data to track the selected individual. In some examples, the tracking module 326 may utilize facial recognition or other image recognition techniques to detect the selected individual and monitor the selected individual's movements. In some examples, the tracking module 326 may use motion tracking techniques to track the movement of the selected individual.

In embodiments, the tracking module 326 may determine whether an individual being tracked (a tracked individual) enters an office space. As discussed above, when the remote user utilizes the hardware device 220 to connect to the telepresence robot 100, the remote user may interact with and have conversations with people located in the remote location. The telepresence robot 100 may move around the remote location such that the remote user can interact with different people in the remote location or follow a particular person located in the remote location (e.g., the selected individual to be tracked). However, if an individual that the remote user is having a conversation with enters an office space, it may be difficult or impossible for the telepresence robot 100 to follow the individual into the office. Accordingly, when an individual that the remote user is conversing with enters an office space, the communication between the remote user and the telepresence robot 100 may be transferred to video conferencing equipment in the office space (e.g., the video conference device 230), thereby allowing the remoter user to continue conversing with the individual via the video conferencing equipment.

As disclosed herein, an office space may refer to any interior room within a building. In some examples, an office space may refer to a Toyota Agile Space or other mobile office. However, in other examples, office space may refer to any type of office, conference room, auditorium, or other interior room within a building.

In some examples, the tracking module 326 may track multiple individuals, which may be selected by the remote user and received by the tracking request reception module 324, and may determine when any one of the tracked individuals enters an office space. In some examples, the tracking module 326 may determine when any individual enters an office space, even if the individual entering the office space has not been selected to be tracked by the remote user.

Figure 4:
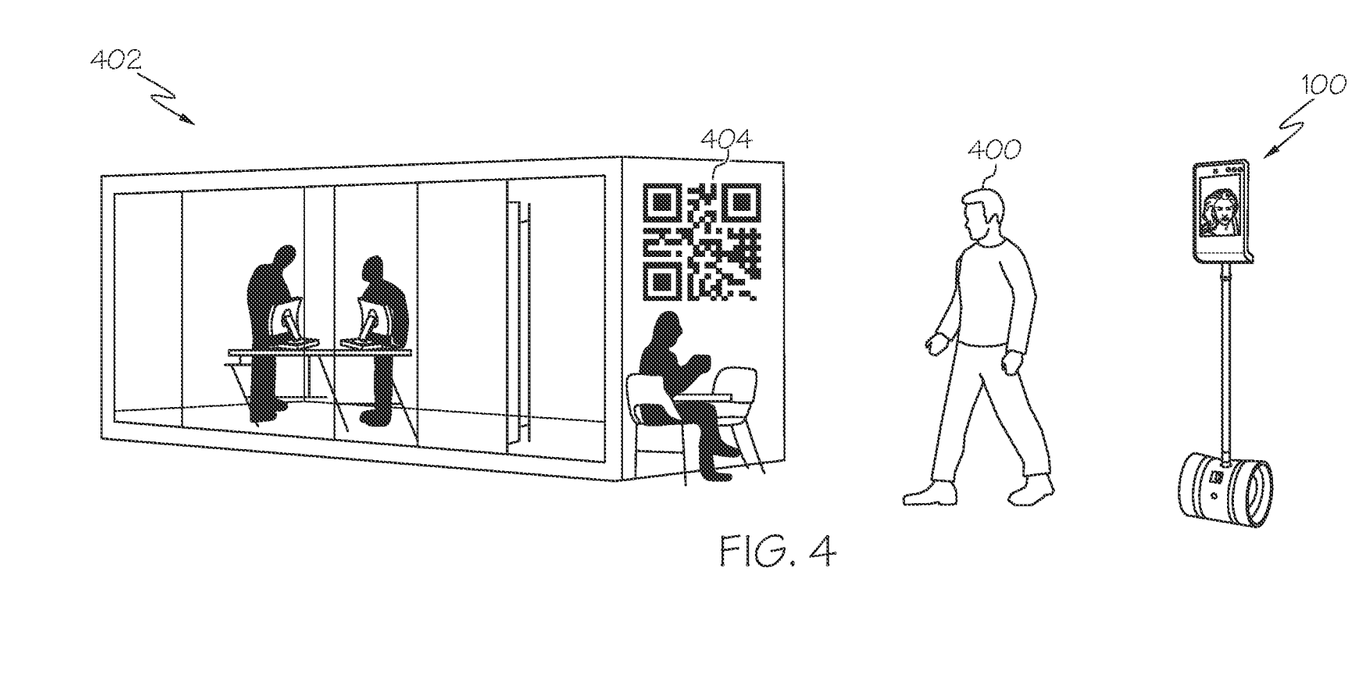
FIG. 4 depicts an example location where the telepresence robot of FIG. 1 may operate, according to one or more embodiments shown and described herein.

When the tracking module 326 determines that a tracked individual has entered an office space, the office detection module 328 may attempt to identify the office space that the tracked individual has entered. In some examples, an office that an individual enters may have a quick response (QR) code or other identifying information that may be used to identify the office. For example, FIG. 4 illustrates the telepresence robot 100 tracking an individual 400) who is about to enter an office 402. As can be seen in the example of FIG. 4, the office 402 has a QR code on a wall of the office 402. The QR code may be located proximate to an entrance of the office 402 such that when the individual 400 enters the office 402, the tracking module 326 may identify the individual entering the entrance of the office 402 and the QR code at the same time.

In some examples, each room within the remote location that has video conferencing equipment may have a QR code or other identifying information positioned on an exterior surface of the office. As such, each room or office space that an individual may walk into may have a QR code that can be used by the tracking module 326 to identify the office. In these examples, the database 312 may store a table or other data structure associating the QR code of each office space with information needed to connect to the video conferencing equipment within the office (e.g., an IP address). In other examples, the office detection module 328 may use other techniques to identify an office space that a tracked individual enters. For example, the database 312 may maintain a map of office spaces within the remote location and when a tracked individual enters an office, the tracking module 326 may identify the office entered based on the location of the office being entered.

In embodiments, when a tracked individual enters an office space, the office detection module 328 may cause the camera 110 and/or the sensors 116 to scan an exterior surface of the office space to identify a QR code. If a QR code is identified, the camera 110 and/or the sensors 116 may scan the QR code and the office detection module 328 may access the database 312 to determine information associated with the video conferencing equipment associated with the office being entered (e.g., an IP address). If a QR code is unable to be identified, the office detection module 328 may transmit a message to the remote user indicating that a QR code could not be found. For example, certain rooms being entered by a tracked individual may not have video conferencing and may not have a QR code or other ID associated with them. Thus, if a tracked individual enters one of these rooms, the telepresence robot 100 will be unable to transfer the connection of the remote user to the interior space being entered. In this case, the telepresence robot 100 may follow the traced individual and enter the office. In some embodiments, if a tracked individual enters a room that does not have video conference equipment or does not have a QR code or other ID, the telepresence robot 100 may output an alert to the individual that the video conference may be ceased. In some embodiments, the telepresence robot 100 may guide the traced individual to an office that has video conference equipment.

Referring back to FIG. 3, the video conference transfer module 330 may transfer a connection with the remote user from the telepresence robot 100 to the video conference device 230 within the office entered by the tracked individual. In particular, the video conference transfer module 330 may terminate the connection between the hardware device 220 of the remote user and the telepresence robot 100 and may establish a new connection between the hardware device 220 of the remote user and the video conference device 230 within the office space entered by the tracked individual. As discussed above, when the tracking module 326 determines that the tracked individual in the remote location has entered an office space, the office detection module 328 may identify the office entered by the tracked individual. In particular, the office detection module 328 may determine information needed to connect to the video conference device 230 within the identified office.

In some examples, the telepresence robot 100 may communicate directly with the hardware device 220 of the remote user and/or the video conference device 230 in the remote location. However, in other examples, the server 240 may relay information for transferring the video conference from the telepresence robot 100 to the video conference device 230 and/or from the video conference device 230 to the telepresence robot 100.

For example, the database 312 may store an IP address associated with the QR code of each office space in the remote location having video conferencing equipment. As such, after the office detection module 328 identifies the office space that the tracked individual has entered, the office detection module 228 may identify the IP address or other ID of the video conference device 230 in the office space. The video conference transfer module 330 may then use the IP address or other identifying information to transfer the connection with the remote user from the telepresence robot 100 to the identified video conference device 230. That is, the video conference transfer module 330 may end the connection between the hardware device 220 of the remote user and the telepresence robot 100 and establish a connection between the hardware device 220 of the remote user and the video conference device 230 within the identified office. In particular, the video conference transfer module 330 may cause the remote user to join a video conference hosted by the video conference device 230 within the office entered by the tracked individual, thereby allowing the remote user to continue remote communication with the tracked individual.

In some examples, after the video conference transfer module 330 transfers the connection with the remote user to the video conference device 230 of the office space entered by the tracked individual, the tracking module 326 may continue to monitor the office space (e.g., with the camera 110 and/or the sensors 116), In particular, the tracking module 326 may detect when the tracked individual who previously entered the office space exits the office space. In these examples, if the tracking module 326 determines that the tracked individual has exited the office previously entered, the video conference transfer module 330 may transfer the connection with the remote user back to the telepresence robot 100. That is, the video conference transfer module 330 may end the connection between the hardware device 220 of the remote user and the video conference device 230 within the office space and re-establish the connection between the hardware device 220 of the remote user and the telepresence robot 100. As such, the remote user may continue to communicate with the tracked individual via the telepresence robot 100 after the tracked individual leaves the office space.

Figure 5:
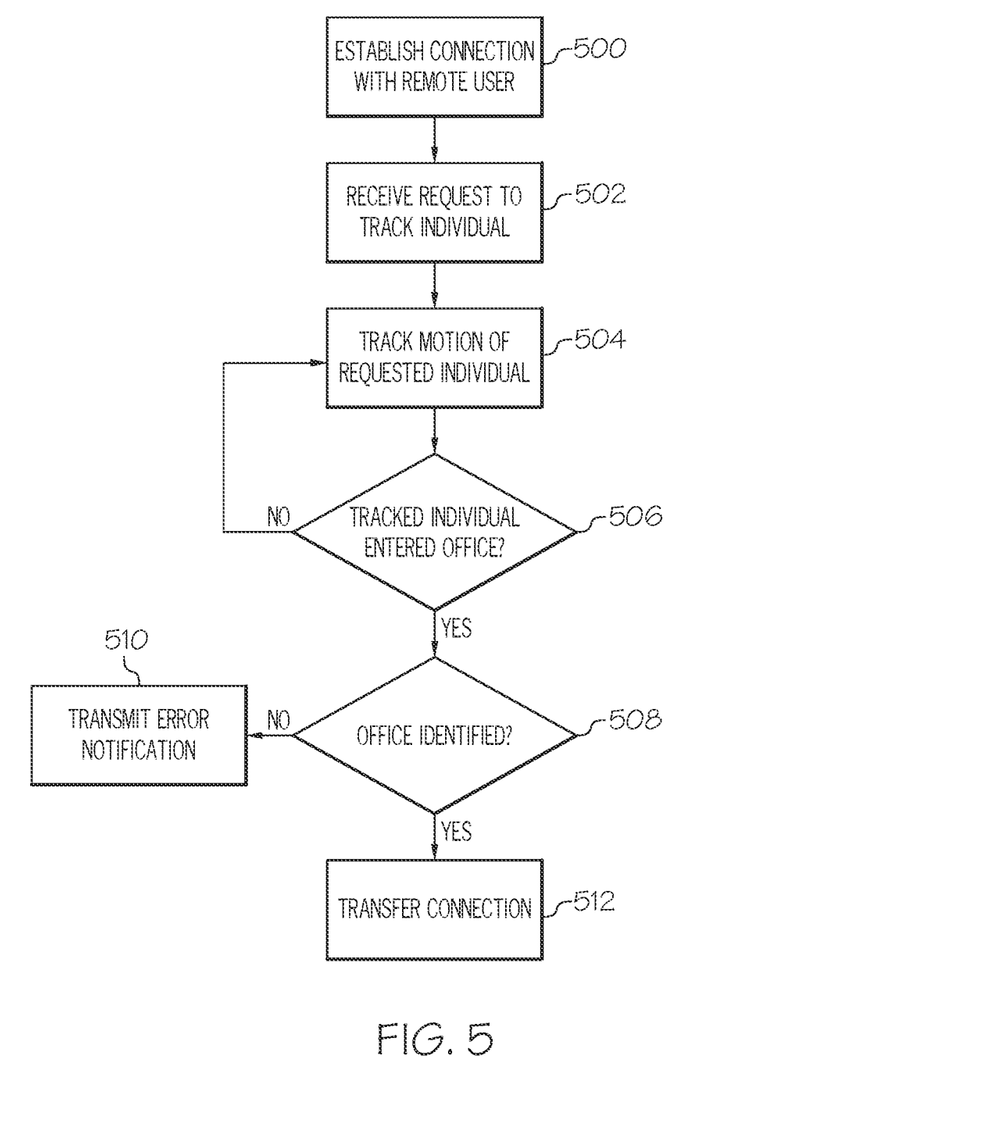
FIG. 5 depicts a flowchart of a method of operating the telepresence robot of FIG. according to one or more embodiments shown and described herein.

FIG. 5 depicts a flowchart of an example method of operating the telepresence robot 100. At step 500, the remote connection module 313 establishes a connection between the hardware device 220 of the remote user and the telepresence robot 100. After establishing a connection between the telepresence robot 100 and the hardware device 220 of the remote user, the media reception module 314 may receive audio and video from the hardware device 220 of the remote user and the media output module 316 may cause the display screen 108 to display the received video and may cause the speaker 114 to output the received audio. Furthermore, the media capture module 318 may receive video captured by the camera 110 and audio captured by the microphone 112 and the media transmission module 320 may transfer the captured audio and video to the hardware device 220 of the remote user.

At step 502, the tracking request reception module 324 receives a request from the remote user to track a particular individual (referred to herein as the tracked individual). At step 504, the tracking module 326 tracks the motion of the tracked individual based on data received by the camera 110 and/or the sensors 116. In some examples, the motion control module 322 may cause the telepresence robot 100 to move in a manner to follow the tracked individual.

At step 506, the tracking module 326 determines whether the tracked individual has entered an office space. The tracking module 326 may make this determination based on data gathered by the camera 110 and/or the sensors 116. Upon determination that the tracked individual has not entered an office space (NO at step 506), control returns to step 504. Upon determination that the tracked individual has entered an office space (YES at step 506), control passes to step 508.

At step 508, after the tracking module 326 has determined that the tracked individual has entered an office space, the office detection module 328 attempts to identify the office space. The office detection module 328 may attempt to identify the office space that the tracked individual has entered by scanning an exterior surface of the office space with the camera 110 and/or the sensors 116 and looking for an ID (e.g., a QR code).

If the office detection module 328 is unable to identify the office space that the tracked individual has entered (NO at step 508), then at step 510, the office detection module 328 transmits a message to the hardware device 220 of the remote user indicating that the telepresence robot 100 is unable to identify the office space that the tracked individual has entered, and consequently, the telepresence robot 100 is unable to transfer the communication to a video conference device within the office space. Alternatively, if the office detection module 328 is able to identify the office space that the tracked individual has entered (YES at step 508), then at step 512, the video conference transfer module 330 transfers the communication with the remote user from the telepresence robot 100 to the video conference device 230 within the office space. In particular, the video conference transfer module 330 may end the communication between the hardware device 220 of the remote user and the telepresence robot 100 and establish communication between the hardware device 220 of the remote user and the video conference device 230 in the entered office space.

It should now be understood that embodiments described herein are directed to a method and system for connection handover from telepresence robot to mobile office. A remote user may establish communication with a telepresence robot located in a remote location and may communicate with individuals in the remote location via the telepresence robot. The remote user may specify an individual in the remote location to be tracked. The telepresence robot may track the selected individual and detect when the selected individual enters an office space. The telepresence robot may then scan a QR code or other ID associated with the office space and transfer communication with the remote user from the telepresence robot to a video conferencing device in the office space based on the ID. As such, the remote user may continue communicating with the selected individual even after the individual has entered the office space without the telepresence robot needing to enter the office space.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A telepresence robot comprising a controller programmed to:
    after establishing a remote connection between the telepresence robot and a remote user, monitor movement of a tracked individual;
    cause the telepresence robot to follow the tracked individual based on the movement of the tracked individual;
    detect when the tracked individual has entered an office space; and
    upon determination that the tracked individual has entered the office space:
        scan an identification associated with the office space;
        look up information associated with the office space in a database on the associated identification; and
        terminate the connection between the telepresence robot and the remote user and establish a new connection between the remote user and a hardware device associated with the office space based on the information associated with the office space.

2. The telepresence robot of claim 1, wherein the device establishes a video conference between the remote user and the hardware device associated with the office space.

3. The telepresence robot of claim 1, wherein the controller is programmed to:
    receive audio and video from the remote user;

cause the telepresence robot to output the audio received from the remote user from a speaker; and cause the telepresence robot to display the video received from the remote user on a display, screen.

4. The telepresence robot of claim 1, wherein the controller is programmed to:
receive video captured by a camera;
receive audio captured by a microphone; and
transfer the received audio and the received video to the remote user.

5. The telepresence robot of claim 1, wherein the controller is programmed to:
receive motion control commands from the remote user; and
cause the telepresence robot to move based on the motion control commands received from the remote user.

6. The telepresence robot of claim 1, wherein the controller is programmed to autonomously control movement of the telepresence robot based on the movement of the tracked individual.

7. The telepresence robot of claim 1, wherein the identification associated with the office space comprises a QR code.

8. The telepresence robot of claim 1, wherein the controller is programmed to receive a request from the remote user to monitor the tracked individual.

9. The telepresence robot of claim 1, wherein the controller is programmed to:
after the tracked individual has entered the office space, detect when the tracked individual has exited the office space; and
upon determination that the tracked individual has exited the office space, terminate the connection between the remote user and the hardware device associated with the office space and establish a new connection between the telepresence robot and the remote user.

10. The telepresence robot of claim 1, wherein the controller is programmed to:
monitor movements of a plurality of tracked individuals;
detect when one or more of the tracked individuals have entered the office space; and
upon determination that one or more of the tracked individuals have entered the office space, terminate the connection between the telepresence robot and the remote user and establish a new connection between transfer the remote user and the hardware device associated with the office space.

11. A method comprising:
after establishing a remote connection between a telepresence robot and a remote user, monitoring movement of a tracked individual;
causing the telepresence robot to follow the tracked individual based on the movement of the tracked individual;
detecting when the tracked individual has entered an office space; and
upon determination that the tracked individual has entered the office space:
scanning an identification associated with the office space;
looking up information associated with the office space in a database on the associated identification; and
terminating the connection between the telepresence robot and the remote user and establishing a new connection between the remote user and a hardware device associated with the office space based on the information associated with the office space.

12. The method of claim 11, further comprising:
receiving audio and video from the remote user;
causing the telepresence robot to output the audio received from the remote user from a speaker; and
causing the telepresence robot to display the video received from the remote user on a display screen.

13. The method of claim 11, further comprising:
receiving video captured by a camera;
receiving audio captured by a microphone; and
transferring the received audio and the received video to the remote user.

14. The method of claim 11, further comprising:
receiving motion control commands from the remote user; and
causing the telepresence robot to move based on the motion control commands received from the remote user.

15. The method of claim 11, further comprising autonomously controlling movement of the telepresence robot based on the movement of the tracked individual.

16. The method of claim 11, further comprising receiving a request from the remote user to monitor the tracked individual.

17. The method of claim 11, further comprising:
after the tracked individual has entered the office space, detecting when the tracked individual has exited the office space; and
upon determination that the tracked individual has exited the office space, terminating the connection between the remote user and the hardware device and establishing a new connection between the telepresence robot and the remote user.

18. The telepresence robot of claim 1, wherein the information associated with the office space comprises an IP address.

* * * * *

UNITED STATES PATENT AND TRADEMARK OFFICE
CERTIFICATE OF CORRECTION

PATENT NO. : 12,047,833 B2
APPLICATION NO. : 17/681249
DATED : July 23, 2024
INVENTOR(S) : Satoshi Nagashima et al.

It is certified that error appears in the above-identified patent and that said Letters Patent is hereby corrected as shown below:

In the Specification

In Column 1, Line(s) 37, after "to", delete ";" and insert --,--, therefor.

In Column 2, Line(s) 8, delete "FIG." and insert --FIG. 1,--, therefor.

In Column 4, Line(s) 55, delete "(NEC)" and insert --(NFC)--, therefor.

In Column 5, Line(s) 55, after "RADAR", delete ",".

In Column 6, Line(s) 43, delete "LTL" and insert --LTE--, therefor.

In Column 9, Line(s) 4, delete "remoter" and insert --remote--, therefor.

In Column 9, Line(s) 28, after "400", delete ")".

In Column 10, Line(s) 63, after "116)", delete "," and insert --.--, therefor.

In the Claims

In Column 13, Line(s) 46, Claim 10, before "the remote", delete "transfer".

Signed and Sealed this
Third Day of September, 2024

Katherine Kelly Vidal
*Director of the United States Patent and Trademark Office*